US007767600B1

(12) United States Patent
Figueroa

(10) Patent No.: US 7,767,600 B1
(45) Date of Patent: Aug. 3, 2010

(54) DETACHABLE, DOMED THREE-DIMENSIONAL DESIGN OR IMAGE FOR INDUSTRIAL WASH

(75) Inventor: Manuel Figueroa, N. Miami Beach, FL (US)

(73) Assignee: World Emblem International, Inc., Miami, FL (US)

( * ) Notice: Subject to any disclaimer, the term of this patent is extended or adjusted under 35 U.S.C. 154(b) by 889 days.

(21) Appl. No.: 11/646,156

(22) Filed: Dec. 26, 2006

(51) Int. Cl.
*B32B 27/04* (2006.01)

(52) U.S. Cl. ..................................................... 442/149

(58) Field of Classification Search ................. 428/189, 428/194, 200, 914; 442/149, 150
See application file for complete search history.

(56) References Cited

U.S. PATENT DOCUMENTS 6,263,598 B1 7/2001 Sullivan

*Primary Examiner*—Arti Singh-Pandey
(74) *Attorney, Agent, or Firm*—K&L Gates LLP

(57) ABSTRACT

The present invention relates to a detachable three-dimensional design or image for industrial wash that may be applied to a fabric. The three-dimensional design or image is formed by performing a doming process on a two-dimensional design or image. The three-dimensional design or image may be attached to the fabric by heat sealing.

18 Claims, 1 Drawing Sheet

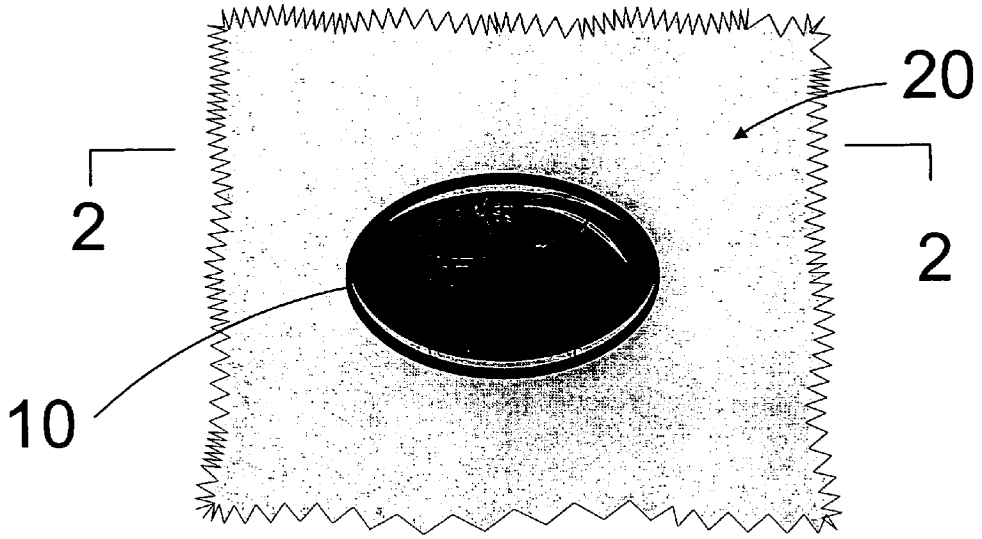
Fig #1
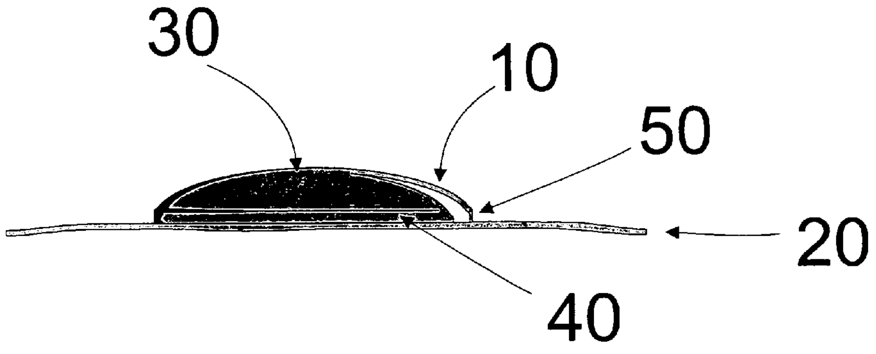
Fig #2

DETACHABLE, DOMED THREE-DIMENSIONAL DESIGN OR IMAGE FOR INDUSTRIAL WASH

FIELD OF THE INVENTION

The present invention relates to three-dimensional designs or images for industrial wash, and specifically to removable domed designs or images capable of being affixed to a fabric surface.

BACKGROUND OF THE INVENTION

Doming is the process of adding a three-dimensional surface, such as a glass-like plastic resin bubble, to a two-dimensional surface to create a three-dimensional product. Doming involves the dispensing of a liquid polyurethane resin onto a printed label or decal in a measured amount. The liquid resin then flows over the surface until its progress is interrupted, usually by the cut edge of the label or decal. Surface tension then holds the liquid in place, and it begins to cure after seven or eight minutes. Cured resin is dry to the touch after about one hour. These setting times assume a normal room temperature of approximately 70° F. (21° C.). The curing process can be accelerated by the application of heat. For example, placing trays of freshly domed labels into special cabinets heated to 90-100° F. (32-38° C.) reduces the cure time to approximately 20 minutes. Alternately, the domed designs or images can be cured inline by means of a conveyor equipped with an infrared heat source.

An appliqué is a decoration or ornament, such as needlework, including a swath of material, which is attached to the surface of another material. An appliqué is typically assembled by cutting a piece of a material and attaching it to the surface of another material. Appliqués are usually attached to the surface of a second material by sewing or by the application of pressure and heat through a heat sealing process. Appliqués may be assembled on most fabrics, and are largely associated with images and designs attached to garments and clothing.

There are other methods besides assembling of appliqués for providing clothing with graphics including, but not limited to, lettering, images, and designs. Sublimation, for example, is a method of applying an image to specially coated ceramics, metals, and polyester cloth. The sublimation process uses sublimation ink, heat, and pressure to bestow a substrate with an image. A heat-sensitive sublimation dye is dissolved in a liquid to print graphics and text and then transferred to special inkjet paper in a process called dye sub transfer. The dye sub transferred ink jet paper and an object with a sublimatable substrate are then placed into a heat press, where pressure and heat are applied to transfer the image to the substrate.

In sublimation, when the heating cycle is completed, the image on the paper has been transferred to the item and has actually become a part of the substrate or surface. Sublimation is typically performed on a polymer or polymer-coated item, such as polyester, as the pores of a polymer are more suitable for integrating the sublimation dye into its substrate. At high temperatures, the solid dyes in the print are converted into a gas without ever becoming a liquid. The high temperature also opens the pores of the polymer and allows the gas to enter them. When the item is removed from the heat press, the temperature drops, the pores close, and the gas reverts to a solid state. The image has now become integral with the substrate of the polymer. If the process is performed correctly, the transferred image cannot be removed, unless the actual fibers or coating is damaged.

Sublimation techniques have drawbacks limiting their application. For example, sublimation is more effective on polymeric substrates than on natural materials, such as those made from 100% cotton. Natural fibers and non-coated materials are not as porous as polymer surfaces. Further, the sublimation process has garnered limited results on non-white substrates. This is because the ink used in the sublimation process is actually transparent when sublimated and is more effectively highlighted by a white background.

Similarly, applying domed emblems to fabrics can be limited by a number of factors, and efficient application methods have yet to be developed. Utilizing a heat press to apply domed graphics, for example, is complicated by the fact that the heat required to secure a satisfactory bond to the fabric damages normal doming-grade adhesives. Additionally, it can be difficult to satisfactorily bond domed designs or images to certain fabrics unless a high enough temperature is used in the heat press.

Typically, such ineffectiveness in bonding techniques results in a garment containing a three-dimensional design or image incapable of withstanding industrial wash cycles. Thus, there is a need therefore for a three-dimensional design or image that can be applied to a garment and is capable of withstanding industrial wash cycles. There is a further need for a three-dimensional design or image which can be interchangeably and detachably applied to garments or other fabrics.

SUMMARY OF THE INVENTION

In satisfaction of these needs and others, the present invention relates to a three-dimensional design or image for industrial wash capable of being attached to a fabric. The three-dimensional design or image includes a two-dimensional surface having a top surface and a bottom surface, a dome positioned on said top surface of the two-dimensional surface, and an adhesive layer attached to the bottom surface of the two-dimensional layer. The adhesive layer may between about 4 mm and about 6 mm in thickness, between about 4.5 mm and about 5.5 mm thick or about 5 mm thick. The adhesive may be polyurethane. Additionally, fabric may be adhered to the adhesive layer. The two-dimensional design may have a graphic thereon, and the graphic may be sublimated.

The fabric may be adhered to the adhesive layer by a heat press process. The dome of the three-dimensional design or image may be plastic resin and may have a three-dimensional shape. The three-dimensional design or image may be detachable from the fabric. The three-dimensional design or image may also remain attached to the fabric after repeated industrial washings.

Another aspect of the invention relates to a method of appending a detachable three-dimensional design or image for industrial wash to a fabric. This method includes providing a three dimensional design or image with a bottom surface wherein the three-dimensional design or image comprises a two-dimensional surface having a top surface and a bottom surface, a dome positioned on the top surface of the two-dimensional surface, and an adhesive layer positioned on the bottom surface of the two-dimensional surface; providing a fabric; and heat sealing the three-dimensional design or image to the fabric.

The heat sealing process may include heating the three-dimensional design or image between about 350 and about 450 degrees Fahrenheit and applying between about 35 and about 65 pounds of pressure per square inch to the three-dimensional design or image for between about 10 and about 14 seconds. In another embodiment, the process of heat sealing includes heating the three-dimensional design or image to 400 degrees Fahrenheit, and applying between about 40 and about 60 pounds per square inch of pressure to the three-dimensional design or image for about 12 seconds.

BRIEF DESCRIPTION OF THE FIGURES

The foregoing and other objects, aspects, features, and advantages of the invention will become more apparent and may be better understood by referring to the following description taken in conjunction with the accompanying drawings, in which:

FIG. 1 is a top view of the detachable three-dimensional design or image according to the present invention; and FIG. 2 is a cross-section of the detachable three-dimensional design or image of FIG. 1 through the plane 2-2'.

DESCRIPTION OF THE PREFERRED EMBODIMENTS

The present invention relates to a non-permanent, detachable three-dimensional design or image for industrial wash. The three-dimensional design or image may be a domed design or image. The three-dimensional design or image may be a patch, logo, or similar design. The three-dimensional design or image may be applied to fabric such as clothing, shoes, hats, coats, or any other item that otherwise would have a patch or logo affixed to it. Once applied, the three-dimensional design or image may be removed. The three-dimensional design or image is affixed in such a manner that the fabric to which the three-dimensional design or image is attached may be repeatedly industrially washed or cleaned without the three-dimensional design or image becoming detached from the fabric.

FIG. 1 is a top view of the detachable three-dimensional design or image for industrial wash according to the present invention. The three-dimensional design or image 10 is applied to a fabric 20 as described below and may also be detached from the fabric. The fabric 20 may be larger than the three-dimensional design or image 10 and may extend beyond the three-dimensional design or image 10. Thus, the three-dimensional design or image 10 may be an appliqué.

FIG. 2 is a cross-section of the detachable three-dimensional design or image 10 through the plane 2-2'. The three-dimensional design or image 10 includes a dome 30, two-dimensional surface 40, and an adhesive layer 50. The three-dimensional design or image 10, may by created by forming a plastic bubble or dome 30 of plastic resin on the two-dimensional surface 40.

The two-dimensional surface 40 may contain a regular logo or emblem, such as a printed image. This logo or emblem may have a sublimated graphic on its surface. The addition of the dome 30 transforms the two-dimensional surface 40 to an eye-catching three-dimensional product. The dome 30 is applied to the two-dimensional surface 40 and encapsulates the two-dimensional surface. The dome 30 may be formed from a flowable rubber material in its fabrication stage as described above, such as poured polyurethane, or a plastic material of similar properties. The three-dimensional design or image 10 may be of any size or shape, and preferably forms a dome-like shape over the two-dimensional surface 40.

The adhesive layer 50 of the three-dimensional design or image 10 is applied to the bottom surface of the two-dimensional surface 40 to releasably affix the three-dimensional design or image 10 to the fabric 20. The adhesive layer 50 may be composed of polyurethane or other types of adhesive. The thickness of the adhesive layer may range from between about 4 mm and about 6 mm, between about 4.5 mm and about 5.5 mm, and preferably about 5 mm.

The three-dimensional design or image for industrial wash may be attached to a fabric surface through the use of a heat sealing process. The heat sealing process bonds the three-dimensional design or image to the fabric surface through the use of heat and pressure. For example, the three-dimensional design may be heat sealed between about 350 and about 450 degrees Fahrenheit, at between about 35 and about 65 pounds per square inch of pressure for between about 10 and about 14 seconds. Preferably, the three-dimensional design may be heat sealed at 400 degrees Fahrenheit, at between about 40 and about 60 pounds per square inch of pressure for about 12 seconds.

This method of affixing the three-dimensional design or image to the fabric facilitates the removal of the three-dimensional design or image. The three-dimensional design or image may be removed from the fabric surface. Thus, the three-dimensional design or image may be detachable.

Furthermore, this heat sealing process creates a firm bond between the fabric and the three-dimensional design or image. Specifically, this process enables the fabrics and garments to which the three-dimensional design or image is applied to withstand repeated washing, including industrial washing. This is particularly helpful in the uniform industry where garments need to be washed repeatedly in industrial wash cycles.

Another aspect of the present invention relates to a method for appending the detachable three-dimensional design or image for industrial wash to a fabric. The first step of the method is to provide a three-dimensional design or image with a bottom surface. The three-dimensional design or image, as described above, includes a two-dimensional surface, a dome and an adhesive layer. The adhesive layer may be a polyurethane layer and may be between about 4 mm and about 6 mm or between about 4.5 mm and about 5.5 mm thick, preferably about 5 mm thick. Second, a fabric surface is provided. Then, the bottom surface of the three-dimensional design or image is heat sealed to the fabric surface, as discussed above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A three-dimensional design capable of being attached to a fabric, comprising:

a two-dimensional surface having a top surface and a bottom surface;

a dome disposed on said top surface of said two-dimensional surface; and an adhesive layer disposed on said bottom surface of said two-dimensional layer.

2. The three-dimensional design of claim 1 wherein said two-dimensional design has a graphic thereon.

3. The three-dimensional design of claim 2 wherein said graphic is sublimated.

4. The three-dimensional design of claim 1 wherein said adhesive layer is between about 4.5 mm and about 5.5 mm thick.

5. The three-dimensional design of claim 1 wherein said adhesive layer is about 5 mm thick.

6. The three-dimensional design of claim 1 wherein said fabric is adhered to said adhesive layer by a heat press process.

7. The three-dimensional design of claim 1 wherein said adhesive is polyurethane.

8. The three-dimensional design of claim 1 wherein said dome comprises plastic resin.

9. The three-dimensional design of claim 1 wherein said dome has a three-dimensional shape.

10. The three-dimensional design of claim 1 wherein said three-dimensional design is detachable from said fabric.

11. The three-dimensional design of claim 1 wherein said three-dimensional design remains attached to said fabric after repeated industrial washings.

12. A method of appending a detachable three-dimensional design to a fabric, comprising:

providing a three dimensional design having a bottom surface, wherein said three-dimensional design comprises a two-dimensional surface having a top surface and a bottom surface;

a dome disposed on said top surface of said two-dimensional surface; and an adhesive layer disposed on said bottom surface of said two-dimensional surface;

providing a fabric; and heat sealing said three-dimensional design to said fabric.

13. The method of claim 12 wherein said adhesive layer comprises polyurethane.

14. The method of claim 13 wherein said polyurethane adhesive layer is between about 4 mm and about 6 mm thick.

15. The method of claim 13 wherein said polyurethane adhesive layer is between about 4.5 mm and about 5.5 mm thick.

16. The method of claim 13 wherein said polyurethane adhesive layer is about 5 mm thick.

17. The method of claim 12 wherein said heat sealing comprises:

heating said three-dimensional design between about 350 and about 450 degrees Fahrenheit; and applying between about 35 and about 65 pounds of pressure per square inch to said three-dimensional design for between about 10 and about 14 seconds.

18. The method of claim 12 wherein said heat sealing comprises:

heating said three-dimensional design to 400 degrees Fahrenheit; and applying between about 40 and about 60 pounds per square inch of pressure to said three-dimensional design for 12 about seconds.

* * * * *